United States Patent [19]

McDonald

[11] Patent Number: 4,904,112
[45] Date of Patent: Feb. 27, 1990

[54] UNDERGROUND IRRIGATION SYSTEM

[76] Inventor: Carroll W. McDonald, 3680 42nd Way S., #D, St. Petersburg, Fla. 33711

[21] Appl. No.: 385,565

[22] Filed: Jul. 26, 1989

[51] Int. Cl.$^4$ ............................................. E02B 13/00
[52] U.S. Cl. ........................................ 405/45; 405/36; 405/43
[58] Field of Search .................... 405/43, 45, 48, 47, 405/49, 38, 36

[56] References Cited

U.S. PATENT DOCUMENTS

| | | | |
|---|---|---|---|
| 3,422,626 | 1/1969 | Hanyahan | 405/43 |
| 3,540,223 | 11/1970 | Ebbe | 405/43 |
| 4,182,581 | 1/1980 | Uchara et al. | 405/43 |
| 4,188,154 | 2/1980 | Izatt | 405/43 |
| 4,697,952 | 10/1987 | Maddock | 405/43 |

Primary Examiner—Dennis L. Taylor

[57] ABSTRACT

An inner pipe having a plurality of apertures on a top surface is connected to a pressurized water input source. The inner pipe is located within a slightly larger outer pipe and rests on a bottom inner surface of the outer pipe. The outer pipe is buried just below a plant root line. A series of longitudinal slots on a bottom portion of the outer pipe permits water flowing from the inner pipe to the outer pipe to trickle unimpeded into the surrounding soil.

10 Claims, 3 Drawing Sheets

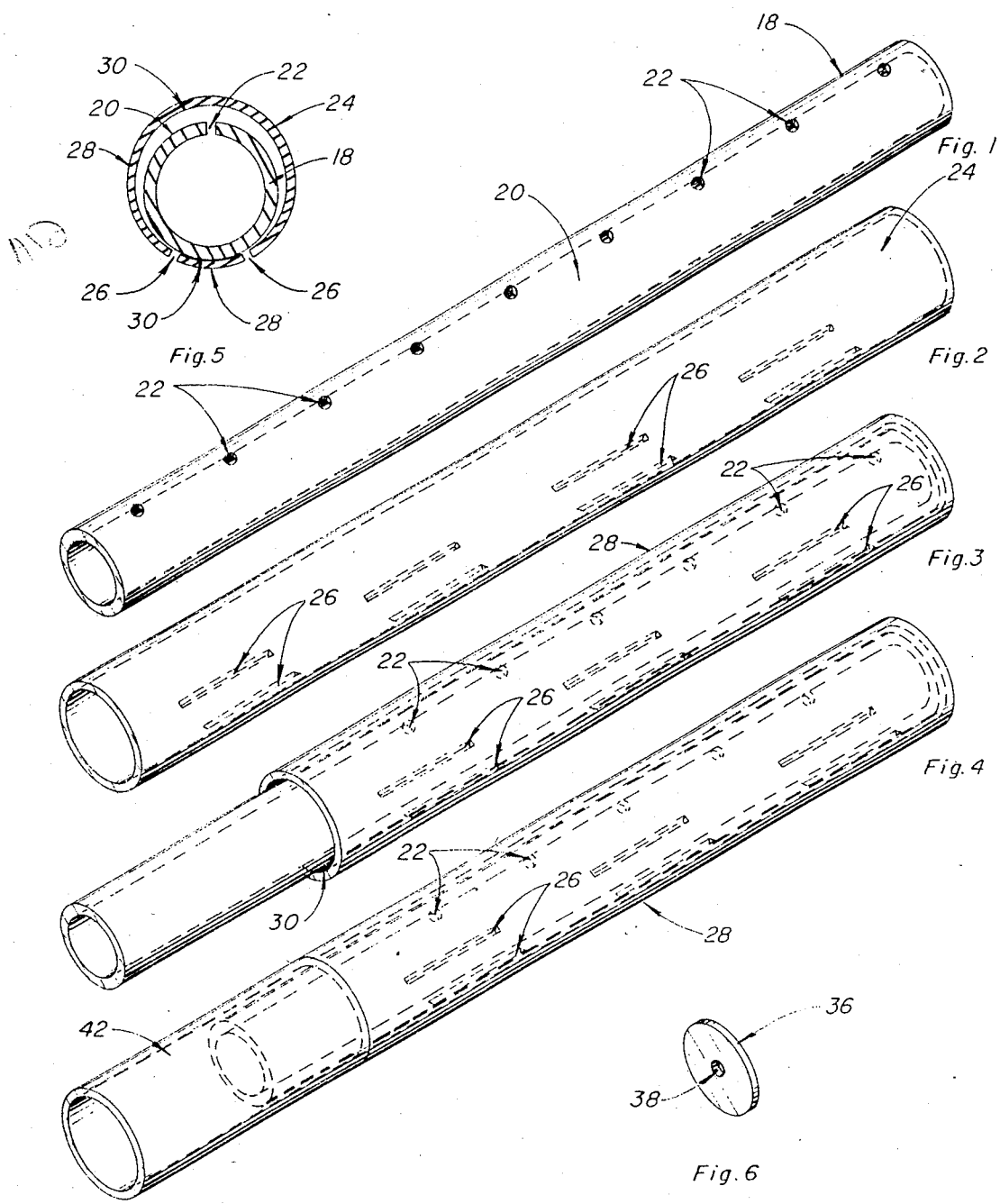

UNDERGROUND IRRIGATION SYSTEM

BACKGROUND OF THE INVENTION

1. Field of The Invention

This invention relates to underground irrigation systems. More particularly, it refers to an underground system of plastic pipes minimizing the use of irrigation water and maximizing root uptake of the water.

2. Description of the Prior Art

Underground irrigation systems are well known as shown by U.S. Pat. No. 3,046,747 wherein cartridges located within a pipe system allows water to seep into the ground; U.S. Pat. No. 3,946,762 describes a fabric material enclosing apertures in an underground pipe so that water flows out of the pipe by capillary action; U.S. Pat. No. 4,188,154 describes a double conduit irrigation pipe wherein an inner pipe is tangent to the top inner surface of the outer pipe; and U.S. Pat. No. 4,721,408 wherein a fluid conducting pipe having apertures has an outer cover overlying the apertures and spaced apart from the fluid conducting pipe. Although all these references provide an underground irrigation systems, these systems are plagued with the problem of blockage from debris in the irrigation water or from surrounding soil or build up of solids in the flow apertures. Generally, high water pressures are required to keep their apertures open. When the system is turned off the apertures are subject to clogging. A system of underground irrigation is needed which will minimize use of water and also permit its continued use for long periods of time without the need to clean the pipe apertures.

SUMMARY OF THE INVENTION

I have invented an irrigation system that can control the amount of water provided to a given soil media and will provide water continuously over an extended period of time without blockage of exit slots. My irrigation system is designed for use on various soil configurations. An inner cylindrical plastic pipe usually made from polyvinyl chloride is connected to a water input source such as a city water main. A plurality of apertures located on a top portion of the inner pipe permits water to flow from the inner pipe to an outer plastic pipe usually made from polyvinyl chloride. The outer pipe is slightly larger and completely encloses the inner pipe. The inner pipe rests on a bottom inner surface of the outer pipe. Slots in the bottom surface of the outer pipe located adjacent to the bottom of the inner pipe permits water to trickle out into the surrounding solid. Water pressure of at least one pound per square inch in the inner pipe keeps water flowing out of the apertures.

BRIEF DESCRIPTION OF THE DRAWINGS

The invention may be best understood by those having ordinary skill in the art by reference to the following detailed description when considered in conjunction with the accompanying drawings in which:

FIG. 1 is a perspective view of the inner plastic pipe with spaced apart top apertures.

FIG. 2 is a perspective view of the outer plastic pipe with spaced apart bottom slots.

FIG. 3 is a perspective view partially in phantom of the two pipes.

FIG. 4 is a perspective view of the outer pipe with the inner pipe and coupler.

FIG. 5 is a section view of the two pipes.

FIG. 6 is a perspective view of a water control disc.

DETAILED DESCRIPTION OF THE INVENTION

Figures 7, 8:
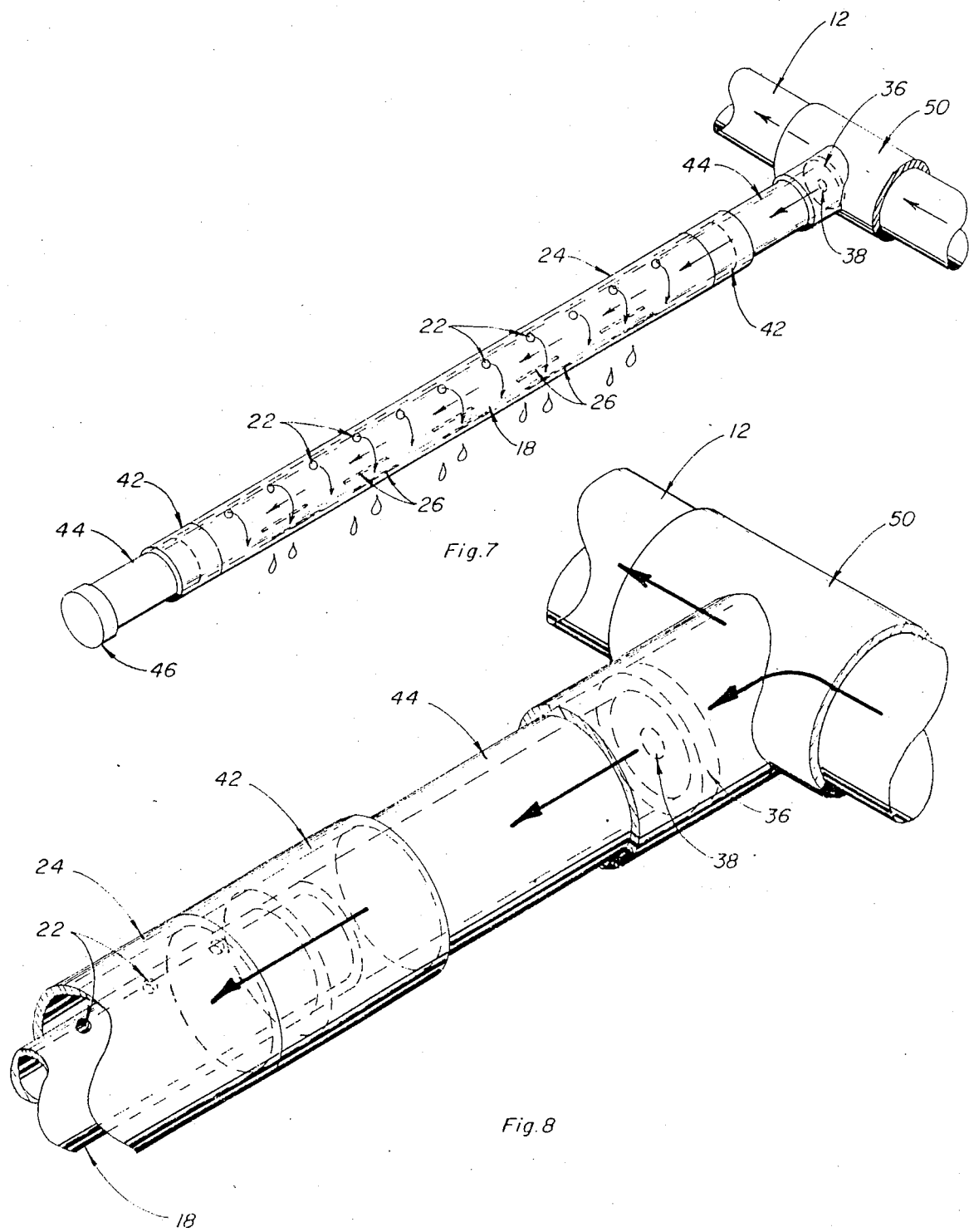
FIG. 7 is a top plan view of a moisture control pipe section.
FIG. 8 is a top plan view of the connection between the water supply pipe and the moisture control pipe.

Throughout the following detailed description, the same reference numerals refer to the same elements in all figures.

Figure 9:
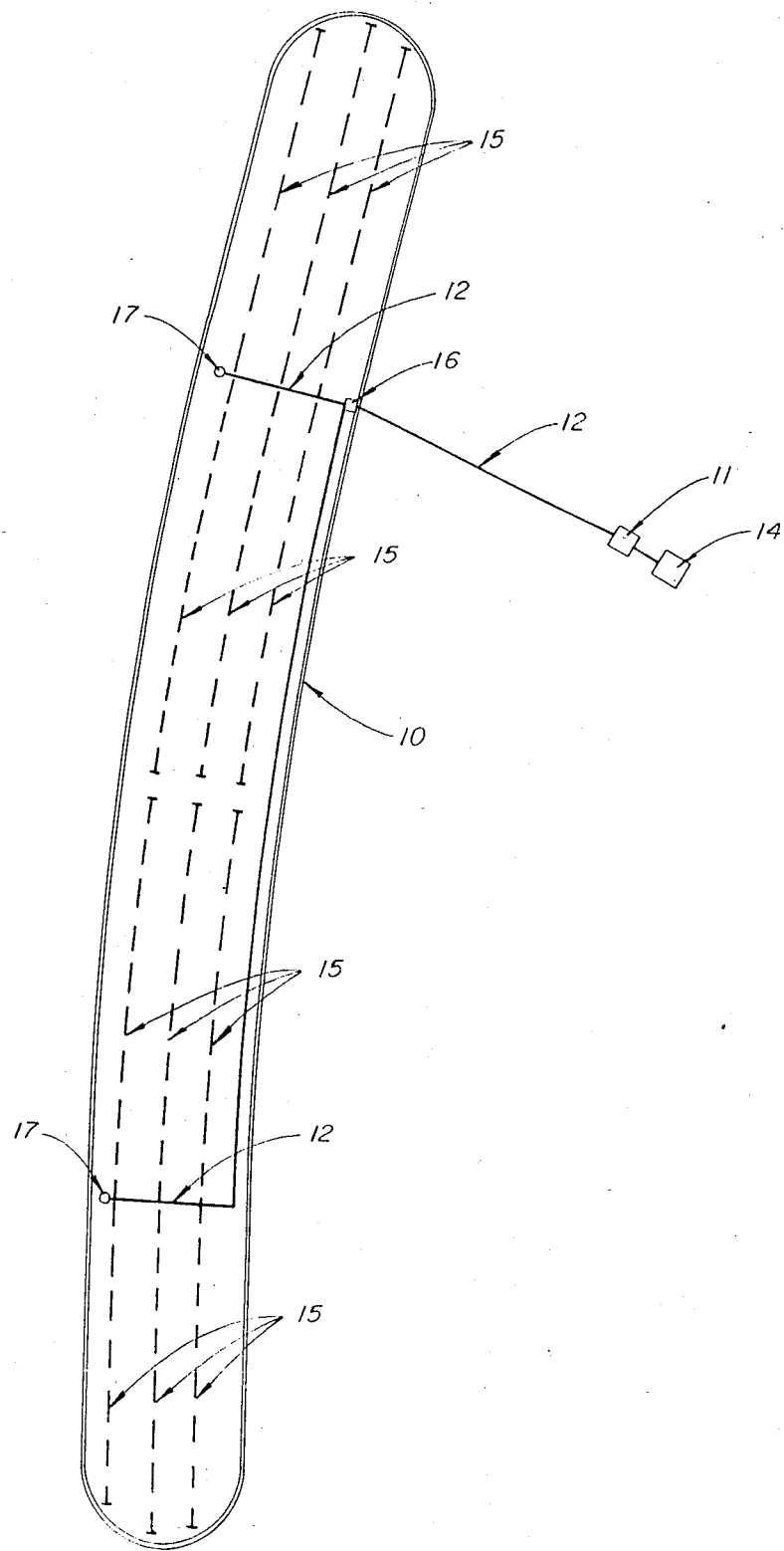
FIG. 9 is a schematic view of a typical installed moisture control pipe system.

The irrigation system 10 as shown in FIG. 9 is a closed system attached to a pressurized water input source 12 which has a shut-off valve 14 for controlling the supply of water and a valve 16 controlling the water pressure into the supply pipe 12. The pressure within supply pipe can be measured with gauge 17. The system 10 as shown on FIG. 9 employs a supply pipe 12 feeding an inner cylindrical moisture control pipe 18 connected to the water input source 12 through a tee 50. Pipe 18 is usually made from a material impervious and inert to water such as polyvinyl chloride, polyethylene or other heavy duty plastic material. The top surface 20 of the inner pipe 18 has a series of apertures 22 located in a linear pattern along the upper surface 20 of inner pipe 18. These apertures have approximately 1/16th to ⅛th inch diameter and are annular in shape. The inner pipe is located within cylindrical outer pipe 24 which is slightly larger than the inner pipe 18. The outer pipe 24 has a series of longitudinally extending slots 26 located in the bottom portion 28 of pipe 24. As seen in FIG. 5, the slots in pipe 24 are located on each side of the inner pipe 18 as it rests on the bottom inner surface 30 of pipe 24.

The inner 18 and outer 24 pipes together identified as moisture control pipes 15 are laid on a surface as shown in FIG. 9 and are covered with soil so that the outer pipe is located four to six inches below the turf. The system 10 is primarily designed for watering grassy areas but can be also employed to water trees, shrubs or crops.

Water flowing into the inner pipe 18 through tee 50 passes through a disk 36 having a small opening 38 so that water volume and velocity can be controlled from the water supply pipe 12 into the inner pipe 18. The water pressure in pipe 12 will vary from 3 psi to as high as necessary for the design of the system. Normal pressure will be about 10 psi. A coupler 42 can be used to connect moisture control pipe 18 to the nipple 44. The inner pipe 18 is connected to a coupler 42 at both ends and a nipple 44 is connected outboard of each coupler. The nipple 44 is used when clean out of the pipe is necessary. An end cap 46 closes the moisture control pipe 18. Water flowing through pipe 18 under pressure of at least one pound per square inch, will exit through apertures 22 at the top portion 20 of pipe 18. Water runs down the side of pipe 18 and then exits through slots 26 through the outer wall of pipe 24. Surrounding soil absorbs the water and is picked up by the plant root system.

In areas where freezing is a problem during the winter time, the top aperture 22 can be moved down on the side of pipe 18 so that an empty space will be created by drainage in pipe 18. This space allows for expansion in case of freezing when the system is shut down.

The slots 26 in pipe 24 are configured in a linear pattern as shown in FIGS. 2 through 4 and each of these slots are about four inches long. The width is about 1/16 inches. Each slot is located just below an aperture 22.

The water pressure, volume and velocity in the system prevents the build up of solids in aperture 38 and the width of slots 26 provide for water egress.

Using my irrigation system, irrigation water can be taken from many different sources such as city water main, from a local pond or holding tank or received directly from a waste water treatment plant. The water should be filtered 11 prior to entering system 10 to an acceptable solids content.

At the present time, there is a concern on the use of water received from waste treatment plants in above ground spraying since airborne viruses and other contaminants could find their way into air breathed by humans. Using my system, such water is not sprayed into the air but goes directly underground.

The exact diameter of pipes 18 and 24 which makes up the moisture control pipes employed in this system 10 can vary depending on the volume of water that is needed for the type of soil. Spacing between the moisture control pipes in a given pattern will vary with the type of soil irriated. For most soils the moisture control pipes will be spaced apart at one to four feet. Generally, the outer moisture control pipe is about ¾ to two inches in diameter. The inner pipe is approximately ⅛ inch narrower in its outer diameter than the inner diameter of the outer pipe.

Having thus described the invention, what is claimed and desired to be secured by Letters Patent is:

1. An underground irrigation system comprising;
an inner plastic cylindrical pipe impervious and inert to water connected to a pressurized water input source, the inner pipe having a plurality of apertures located on a top portion to permit flow of water from the interior to the exterior of the inner pipe, an outer cylindrical pipe slightly larger in interior diameter from an outer diameter of the inner pipe, the outer pipe being impervious to water and inert to soil chemicals enclosing the inner pipe, the inner pipe sealed at an end distal from the water input source to form a closed system, the outer pipe having a plurality of longitudinal slots located on a bottom portion with a bottom portion of the inner pipe resting on the bottom portion of the outer pipe, the outer pipe resting on an underground soil strata and being covered with soil, the slots permitting water to trickle from the outer pipe into the surrounding soil area which requires at least one pound per square inch pressure to be exerted on the water supply within the inner pipe.

2. The underground irrigation system according to claim 1 wherein a flow control disk is interposed between the water input source and an opening to the inner pipe so that water volume entering the inner pipe will be controlled by the pressure in the supply pipe.

3. The underground irrigation system according to claim 1 wherein the inner and outer pipes are polyvinyl chloride.

4. The underground irrigation system according to claim 3 wherein the inner pipe apertures are located at the top of the pipe and are spaced apart linearly.

5. The underground irrigation system according to claim 4 wherein the apertures are annular and have a diameter of 1/16 to ⅛ inches.

6. The underground irrigation system according to claim 1 wherein the outer pipe slots are located on each side of the bottom portion of the inner pipe.

7. The underground irrigation system according to claim 6 wherein the slots are about four inches in length.

8. An underground irrigation system comprising an inner cylindrical plastic moisture control pipe connected to a pressurized water input source with a flow control disc interposed between an opening to the inner pipe and the water input source, the inner pipe having a plurality of annular apertures, the apertures spaced apart in a linear pattern over a top surface of the inner pipe to permit water under at least one pound per square inch of pressure to flow from the inner pipe to an outer cylindrical plastic pipe enclosing the inner pipe sealed at each end, the inner pipe resting on an inner bottom surface of the outer pipe, a plurality of slots in a linear pattern along a bottom portion of the outer pipe and located adjacent to the inner pipe to permit water to trickle out of the outer pipe to surrounding soil in which the outer pipe is buried.

9. The underground irrigation system according to claim 8 where the inner pipe has a coupler at each end and each coupler is attached to a nipple, a nipple at an end distal from the water input being end capped to close the inner moisture control pipe.

10. The underground irrigation system according to claim 8 wherein the apertures in the inner pipe have a diameter of less than ⅛ inch.

* * * * *